United States Patent [19]

Hunter

[11] 3,853,807

[45] Dec. 10, 1974

[54] HEAT RESISTANT DYES FOR POLYESTER FILM PRODUCTS

[76] Inventor: C. Shelburn Hunter, 1669 Lake Ave., Rochester, N.Y. 14650

[22] Filed: Apr. 9, 1973

[21] Appl. No.: 349,603

Related U.S. Application Data

[60] Division of Ser. No. 146,501, May 24, 1971, Pat. No. 3,822,132, which is a continuation-in-part of Ser. No. 822,032, May 5, 1969, abandoned.

[52] U.S. Cl. ............... 260/40 R, 96/84 R, 96/87 R
[51] Int. Cl. ............................................. C08g 51/14
[58] Field of Search .......... 96/84 R, 87 R; 117/33.3, 117/138.8 F; 260/40 R

[56] References Cited
UNITED STATES PATENTS
3,728,124   4/1973   Whyte ................................ 96/84 R Primary Examiner—Ronald H. Smith
Attorney, Agent, or Firm—E. W. Milan

[57] ABSTRACT

Certain azabenzanthrone and diazabenzanthrone dyes have been found
a. to be peculiarly resistant to spontaneous high temperature degradation, and
b. to be particularly useful as colorants for photographic film products made by extruding a dyed polyester film base.

In combination with a green dye such as 1,4-dihydroxy-5,8-di-p-toluidino anthraquinone or 1,4-di-p-butyl anilino-5,8-dihydroxy anthraquinone, which has the ability to inhibit or minimize edge fog in light sensitive film products having a polyester substrate, the red azabenzanthrone or diazabenzanthrone dye is particularly useful in the form of an approximately "neutral" colored film substrate.

18 Claims, No Drawings

HEAT RESISTANT DYES FOR POLYESTER FILM PRODUCTS

This is a division, of application Ser. No. 146,501 filed May 24, 1971, now U.S. Pat. No. 3,822,132, which patent application is a continuation-in-part of U.S. Pat. application Ser. No. 822,032, filed May 5, 1969, now abandoned.

The present invention relates to internally dyed polyester materials, particularly light sensitive film products having polyester substrates, which are resistant to the formation of edge fog.

It is well known that polyester polymers consisting mainly of linear chains of repeating residues of glycols containing from 2 to 12 carbon atoms and dicarboxylates containing from 4 to 20 carbon atoms have unusually high melting points when their average molecular weights are above about 20,000. For example, the melting point of commercially produced poly(ethylene terephthalate) having an intrinsic viscosity of 1 and a molecular weight of about 30,000 is about 264°C, while the melting points of many other linear polyesters of commercial importance today are still higher.

Because of their very high melting points, such polyester materials present an unusually difficult problem to dye chemists, whose task it is to compound a wide variety of colored polyesters for such important markets as the textile and floor covering markets, and the like. That problem relates to the generally relatively poor heat stability of colorant materials when polyesters containing the colorant materials dispersed or dissolved therein are subjected to conventional commercial heat-forming operations. In such heat-forming operations, such as extruding films and fibers, for example, the mixture of polyester and colorant must be maintained in the molten condition (at a temperature above the melting point of the polyester) for a fairly extended period of time, of at least about 15 minutes usually, and sometimes as much as 60 minutes or more. Under such extreme temperature conditions, almost every organic dye material tested has been found to be insufficiently heat stable to be acceptable for use as a colorant in heat-formed polyester articles.

In order to qualify as an "acceptable" colorant for heat-formed polyester articles, a colorant must not only have the requisite heat stability, per se, but it must also have excellent color stability in the molten polyester environment at temperatures of at least about 275°C for at least 30 minutes (preferably for at least about 60 minutes to simulate actual production conditions). In addition, the colorant must be compatible with the polyester in amounts up to at least about 0.01 weight percent, which includes most practical use levels. However, sometimes as little as 3 ppm has proven useful. Compatibility can readily be ascertained by observing a blend of colorant with polyester that has been heated above 275°C (and above the melting point of the polyester) for 15–30 minutes. Incompatibility is evidenced by the gathering together in the polyester of distinct "spots" or fairly large particles of colorant.

Still another requirement that a truly widely useful colorant for polyester articles must meet is that relating to the resistance of the colorant, in the polyester environment, (wherein the polyester is in both the molten and solidified states) to sublimation. Some organic colorants that might otherwise be considered acceptable for use as colorants in heat-formed polyester articles fail in this respect. Sublimation contributes to many undesirable effects, including instability of the color in the final product, and difficulty in controlling (and reproducing) colors from the standpoint of the manufacturers of the heat-formed products. In addition, colorants for use in photographic films must not poison the radiation sensitive layers.

Hence, acceptable colorants for heat-molded polyester products must be at least (a) chemically (color) stable in the molten polyester environment for an extended period of time, (b) compatible with the polyesters at practical usage levels of at least about 0.01 weight percent, and (c) must not sublime out of, or away from, the polyester, either in the molten state or in the solid state, even after a prolonged period of time.

It has now been discovered that certain azabenzanthrone and diazabenzanthrone materials, surprisingly, have the requisite heat stability, compatibility and non-sublimation properties in the molten polyester environment to qualify them as "acceptable" colorants for the commercial manufacture of colored, heat-formed polyester articles. The materials that have been discovered to have the requisite very high level of heat stability and compatibility are those azabenzanthrone or diazabenzanthrone materials having a structure selected from the group consisting of

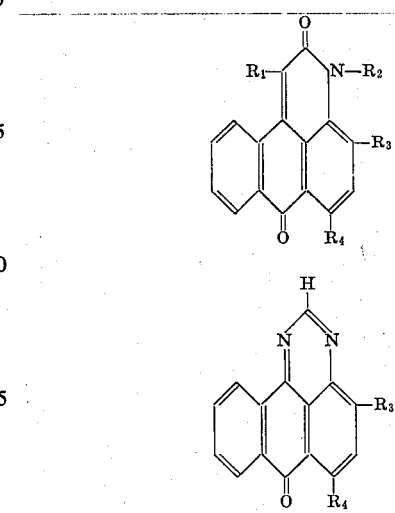

wherein $R_1$, $R_2$, $R_3$, and $R_4$, are selected from the group consisting of H, —OH, —NHhd 2, —NO$_2$,

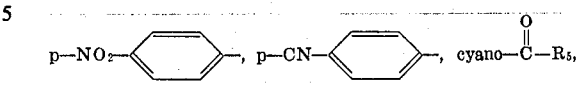

substituted amino, amido, sulfonamido, alkyl, aryl, aralkyl, alkaryl; at least one $R_1$, $R_2$, $R_3$, and $R_4$ being other than H, and at most two of $R_1$, $R_2$, $R_3$ and $R_4$ having radical weights above about 70; and $R_5$ is the same as $R_1$, $R_2$, $R_3$, and $R_4$.

It is particularly advantageous that a wide range of colors is represented by this group of materials, so that, by blending them, and by using one or more of them in combination with other compatible colorant materials, a very wide range of tinted or colored materials can be made using the colorants of the present invention.

A particularly preferred group of the azabenzanthrone and diazabenzanthrone colorant blends (with one or more of the polyesters described hereinbefore) include heat-formed compositions which contain the polyester(s) plus one or more of the following colorant materials. (The names in parenthesis after the name of the colorant is the tint of the colored polyester containing the colorant):

2,3-dihydro-1-ethoxycarbonyl-3-methyl-2-oxo-6-p-toluenesulfonamido-3-azabenzanthrone (yellow)

(a)
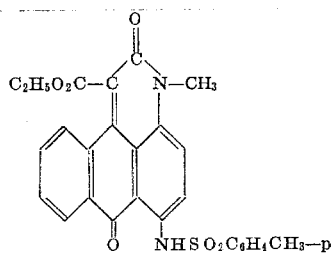

2,3-dihydro-3-methyl-2-oxo-1-p-toluidino-3-azabenzanthrone (yellow)

(b)
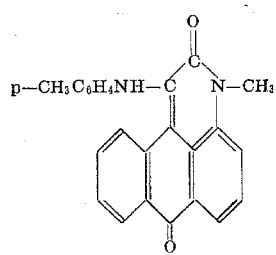

6-amino-4-p-toluidino-1,3-diazabenzanthrone (orange)

(c)
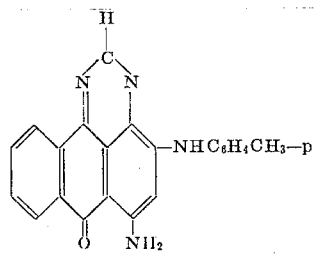

2,3-dihydro-6-[N-3-(dimethylamino)-propylamino]-3-methyl-2-oxo-1-phenyl-3-azabenzanthrone (red)

(d)
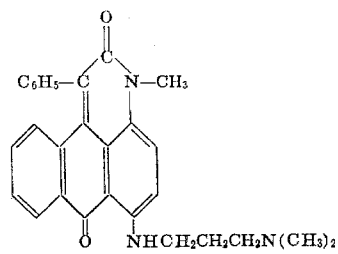

4-p-chloroanilino-1,3-diazabenzanthrone (orange)

(e)
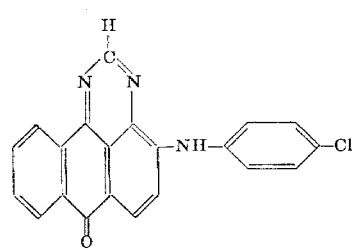

2,3-dihydro-3-methyl-6-[p-(1-methylbutyl)anilino]-2-oxo-1-phenyl-3-azabenzanthrone (violet)

(f)
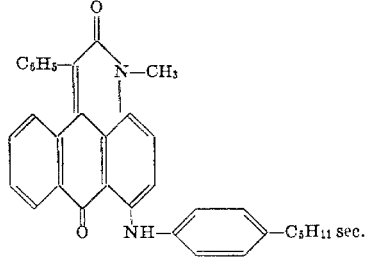

4-anilino-6-[N-(2,4-dichlorobenzoyl)amino]-1,3-diazabenzanthrone (orange)

(g)
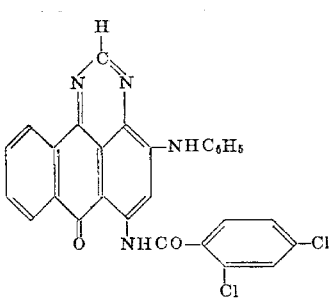

2,3-dihydro-6-(2,4-dimethylanilino)-1-ethoxycarbonyl-3-methyl-2-oxo-3-azabenzanthrone (violet)

(h)
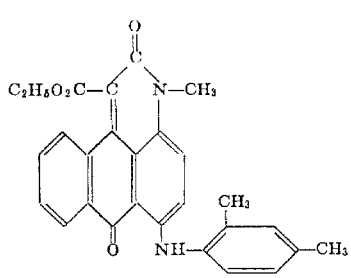

2,3-dihydro-6-p-chloroanilino-1-cyano-3-methyl-2-oxo-3-azabenzanthrone (blue)

(i) 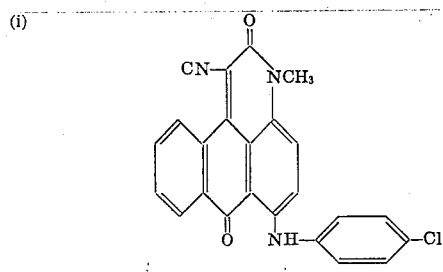

2,3-dihydro-1-ethoxycarbonyl-3-methyl-2-oxo-6-p-toluidino-3-azabenzanthrone (magenta)

(j) 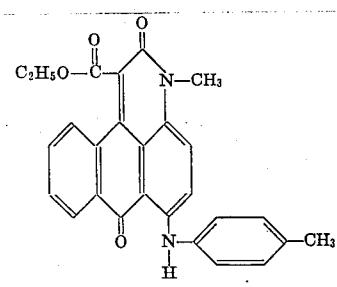

2,3-dihydro-1-ethoxycarbonyl-3-methyl-2-oxo-6-m-toluidino-3-azabenzanthrone (magenta)

(k) 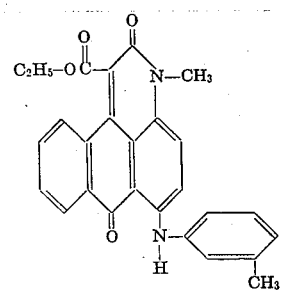

2,3-dihydro-1-ethoxycarbonyl-3-methyl-2-oxo-6-o-toluidino-3-azabenzanthrone (magenta)

(l) 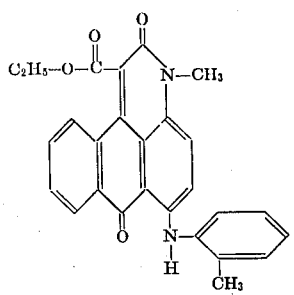

2,3-dihydro-3-methyl-2-oxo-6-p-toluidino-3-azabenzanthrone (red)

(m) 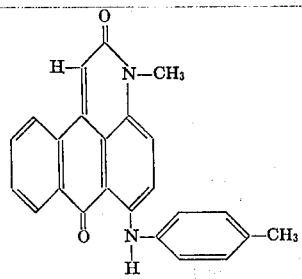

2,3-dihydro-6-(4'-t-amylanilino)-1-ethoxycarbonyl-3-methyl-2-oxo-3-azabenzathrone (magenta)

(n) 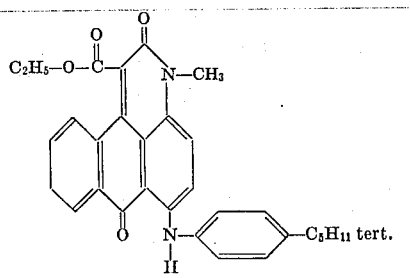

2,3-dihydro-3-methyl-6-(2,4-dimethylanilino)-1-phenyl-3-azabenzathrone (magenta)

(o) 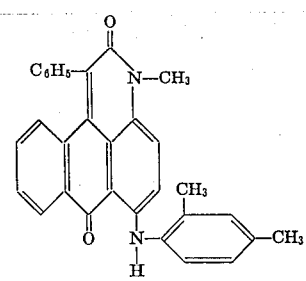

It is noteworthy that, whereas the azabenzanthrone and diazabenzanthrone materials described above can be generically considered to be "anthracene-derived" dyes, it is recognized that by far the greater majority of such "anthracene-type" dyes (including many anthraquinone-type dyes) are either unstable or incompatible in polyester systems such as those about which the present invention is concerned. For example, dyes of the following type have been found to spontaneously degrade excessively when they are held in molten poly(ethylene terephthalate) for one hour at a temperature of 280°C (at the 500 ppm level).

(p) 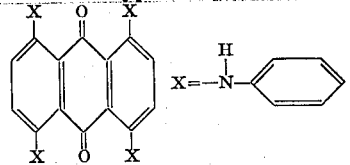

1,4,5,8-tetraanilino anthraquinone (q) 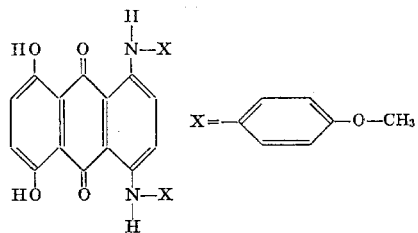

1,4-bis-p-methoxyanilino-5,8-dihydroxy anthraquinone (r) 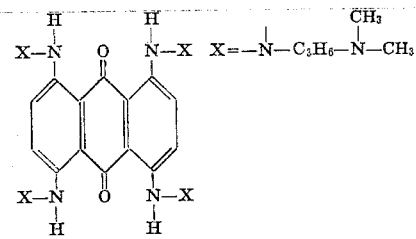

1,4,5,8-tetra (γ-dimethylaminopropylamino) anthraquinone (s) 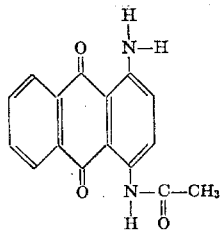

1-amino-4-acetamido anthraquinone (t) 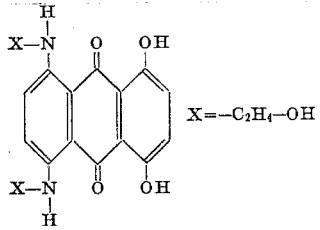

1,4-dihydroxy-5,8-di-β-hydroxyethylamino anthraquinone (u) 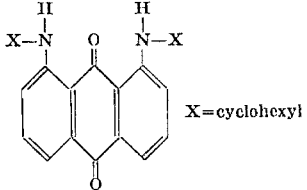

1,8-bis-cyclohexyl anthraquinone (v) 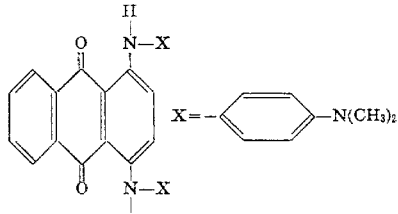

1,4-bis-p-(N,N-dimethyl) anilino anthraquinone (w) 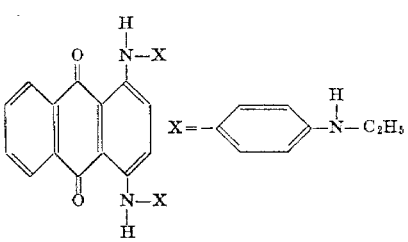

1,4-bis-p-ethylamino anilino anthraquinone (x) 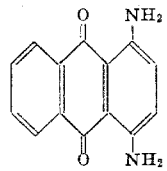

1,4-diamino anthraquinone (y) 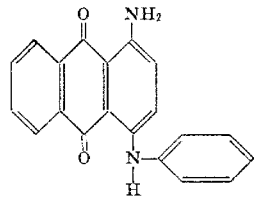

1-amino-4-anilino anthraquinone (z) 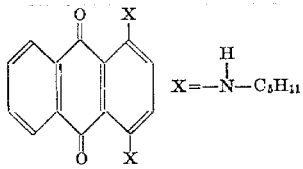

1,4-diamylamino anthraquinone (z-1) 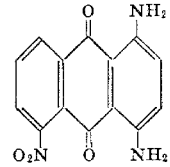

1,4-diamino-8-nitro anthraquinone

In one of the preferred embodiments of the present invention, a red azabenzanthrone is used in combination with a heat-stable, compatible, non-subliming green dye in a thin polyester film (0.5 to 30 mils in thickness) in order to yield a substrate for a photographic film which is essentially neutral in color and in which the problem of "edge fog" is minimized. Examples of this preferred embodiment is the use of a combination of a red azabenzanthrone dye such as 2,3-dihydro-3-methyl 2-oxo-6-p-toluidino-3-azabenzanthrone (I) with either (or a mixture thereof) 1,4-dihydroxy-5,8-di-p-toluidino-anthraquinone (II) or 1,4-di-p-butyl anilino-5,8-dihydroxy anthraquinone (III), which are stable, compatible green dyes. Dyes II and III are particularly valuable for use in polyester film bases not only because of their excellent high temperature stability and compatibility but also because they rank among the very few dyes (necessary in this end use in combination with a stable, compatible red dye to obtain a "neutral" color in the film base) that absorb efficiently in the near infra-red (700–800 nm) region of the electromagnetic spectrum. It is apparently this peculiar ability of absorb efficiently in the near infra-red region of the spectrum that causes these dye combinations to inhibit edge fog so markedly when they are used in sufficiently small amounts in the film base to create acceptable, low optical densities. For example, in a typical commercial photographic film product having a 4mil thick poly(ethylene terephthalate) substrate, whereas only about 0.1 optical density is generally adequate to prevent most edge fog, it is often desirable for other reasons well known to the photographic art that the optical density of the substrate be at most about 0.5, and preferably at most about 0.35 (for panchromatic films) and at most about 0.15 for color films. See the disclosure of U.S. Pat. No. 2,622,026 for details about red cyan dye combinations useful in cellulose ester film substrates.

A detailed example of a particularly preferred embodiment of the present invention is the use of 88 parts per million of 2,3-dihydro-3-methyl-2-oxo-6-p-toluidino-3-azabenzanthrone (a red dye) and 144 parts per million of 1,4-dihydroxy-5,8-di-p-toluidino-anthraquinone (a green dye) in a polyester film base which has a layer of conventional photographic emulsion over one surface. Another particularly preferred embodiment of this aspect of the present invention is the use of 80 parts per million of the same red azabenzanthrone dye with 140 parts per million of 1,4-di-p-butyl anilino-5,8-dihydroxy anthraquinone (green) in an otherwise conventional photographic film element having a polyester (containing these dyes) substrate. In these particularly preferred embodiments, the visually "neutral" color can be obtained by simply "balancing" appropriate amounts of the respective red and green dyes. In general, however, the amount of red dye can be varied from about 40 to about 600 parts per million, while the green dye can be varied from about 60 to about 1,000 parts per million. Greater amounts can be used, but the optical density of the film base (or the resulting negative after exposure and development of the sensitized article) should preferably be at most about 0.3 unless it is preferred that the resulting developed article not be used as a transparency.

Other materials, such as plasticizers, other colorant materials, and dispersions (such as carbon, titanium dioxide, and/or silica) can also be present in the colored, heat-formed compositions of this invention. Particularly preferred polyesters for use in the practice of this invention include poly(ethylene terephthalate) and poly(1,4-cyclohexylenedimethylene terephthalate) and copolymers containing them.

The polyester compositions of this invention can be manufactured by any of a number of methods which will be manufactured by any of a number of methods which will be immediately evident to those artisans in this field. Thus, the powdered colorant can simply be mechanically blended with granules, pellets or flakes of the polyester in appropriate amounts at any time prior to the point where the polyester is melted and heat-formed. Or, if desired, a "concentrate" or dye and polyester can be prepared separately, and then blended with more of the polyester as desired or needed to accomplish the final colored, heat-formed article. Colorants can also be present when the polyester is formed. Heat-forming can be accomplished in any manner desired, in which manner the blend of colorant and polyester is melted (or sufficiently softened to cause it to take a particular form), heat-formed by extrusion or compression or vacuum molding, for example, and then cooled and solidified. For example, the heat-formed articles of this invention include (but are not limited to) films, coatings, molded articles, fibers, and the like. The articles can also be processed in any of a number of ways subsequent to the heat-forming, without detracting from any of the benefits that can be obtained by practicing this invention. For example, they can be cut, spliced, punched, subjected to crystallization, even chopped into small pieces, and even re-melted and heat-formed again, if desired.

The invention has been described in detail with particular reference to preferred embodiments thereof, but it will be understood that variations and modifications can be effected within the spirit and scope of the invention.

What is claimed is:

1. A colored polyester film article having a thickness of from about 0.5 to about 30 mils, an optical density of at most about 0.5, and a uniform, approximately neutral color; said film article containing a blend of dyes, which blend consists essentially of the red dye 2,-3-dihydro-3-methyl-2-oxo-6-p-toluidino-3-azabenzanthrone and the green dye 1,4-dihydroxy-5,8-di-p-toluidino anthraquinone.

2. A article as in claim 1, wherein said polyester consists essentially of poly(ethylene terephthalate).

3. An article as in claim 1, wherein said polyester consists essentially of poly(1,4-dimethylenecyclohexylene terephthalate).

4. A colored polyester article, comprising a blend of (1) at least one azabenzanthrone or diazabenzanthrone dye selected from the group of dyes having structures:

(A)

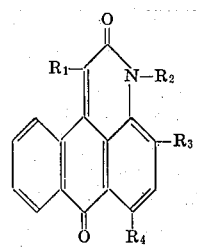

or (B)

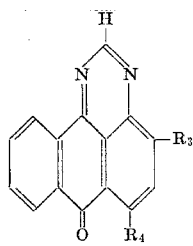

wherein $R_1$, $R_2$, $R_3$, and $R_4$ are selected from the group consisting of -H, -OH, -$NH_2$, -$NO_2$,

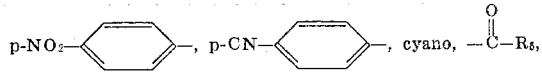

N-3(dimethylamino)-propylamino, N-(2,4-dichlorobenzoyl) amino, 4'-t-amylanilino, p-chloranilino, 2,4-dimethylanilino, p-(1-methylbutyl)anilino, o-, m-, and p-toluidino, amido, sulfonamido, alkyl, aryl, and alkaryl; at least one of $R_1$, $R_2$, $R_3$, and $R_4$ being other than H, and at most two of $R_1$, $R_2$, $R_3$, and $R_4$ having radical weights above about 70; and $R_5$ is the same as $R_1$, $R_2$, $R_3$, or $R_4$; and (2) at least one green dye selected from the group consisting of 1,-4-dihydroxy-5,8-di-p-toluidino anthraquinone and 1,4-di-p-butyl anilino-5,8-dihydroxy anthraquinone, said green dye being 1,4-dihydroxy-5,8-di-p-toluidino anthraquinone when said azabenzanthrone or diazabenzanthrone dye is selected from group (A) or (B) and when said green dye is 1,4-di-p-butyl anilino-5,8-dihydroxy anthraquinone, said azabenzanthrone or diazabenzanthrone dye is selected from group (B).

5. An article as in claim 4, wherein said green dye is 1,4-dihydroxy-5,8-di-p-toluidino anthraquinone and said diazabenzanthrone dye is

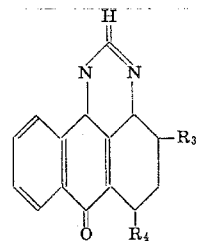

wherein $R_3$, and $R_4$ are selected from the group consisting of -H, -OH, -$NH_2$,

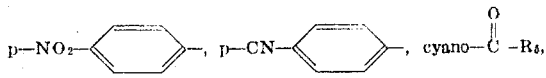

N-3-(dimethylamino)-propylamino, N-(2,4-dichlorobenzoyl) amino, 4'-t-amylanilino, p-chloroanilino, 2,4-dimethylanilino, p-(1-methylbutyl)anilino, o-, m-, and p-toluidino, amido, sulfonamido, alkyl, aryl, and alkaryl; at least one of $R_3$, and $R_4$ being other than H, and at most each of $R_3$, and $R_4$ having radical weights above about 70; and $R_5$ is the same as $R_3$ or $R_4$.

6. An article as in claim 5, wherein said diazabenzanthrone dye is 6-amino-4-p-toluidino-1,3-diazabenzanthrone, 4-p-chloroanilino-1,3-diazabenzanthrone, or 4-anilino 6-[N-(2,4-dichlorobenzoyl)amino]-1,3-diazabenzanthrone.

7. An article as in claim 4, wherein said green dye is 1,4-dihydroxy-5,8-di-p-toluidino anthraquinone and said azabenzanthrone dye is

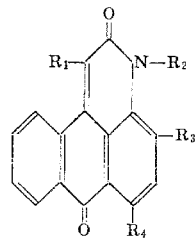

wherein $R_1$, $R_2$, $R_3$, and $R_4$ are selected from the group consisting of -H, -OH, -$NH_2$,

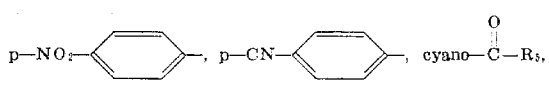

N-3(dimethylamino)-propylamino, N-(2,4-dichlorobenzoyl) amino, 4'-t-amylanilino, p-chloranilino, 2,4-dimethylanilino, p-(1-methylbutyl)anilino, o-, m-, and p-toluidino amido, sulfonamido, alkyl, aryl, and alkaryl; at least one of $R_1$, $R_2$, $R_3$, and $R_4$ being other than H, and at most two of $R_1$, $R_2$, $R_3$ and $R_4$ having radical weights above about 70; and $R_5$ is the same as $R_1$, $R_2$, $R_3$, or $R_4$.

8. An article as in claim 7, wherein said green dye is 1,4-dihydroxy-5,8-di-p-toluidino anthraquinone and said azabenzanthrone dye is 2,3-dihydro-1-ethoxycarbonyl-3-methyl-2-oxo-6-p-toluenesulfonamido-3-azabenzanthrone, 2,3-dihydro-3-methyl-2-oxo-1-p-toluidino-3-azabencanthrone, 2,3-dihydro-6-[N-3-(dimethylamino)-propylamino]-3-methyl-2-oxo-1 phenyl-3-azabenzanthrone, 2,3-dihydro-3-methyl-6-[p-(1-methyl-butyl)anilino]-2-oxo-1-phenyl-3-azabenzanthrone, 2,3-dihydro-6-(2,4-dimethyl-anilino)-1-ethoxycarbonyl-3-methyl-2-oxo-3-azabenzanthrone, 2,3-dihydro-6-p-chloroanilino-1-cyano-3-methyl-2-oxo-3-azabenzanthrone, 2,3-dihydro-1-ethoxycarbonyl-3-methyl-2-oxo-6-p-toluidino-3-azabenzanthrone, 2,3-dihydro-1-ethoxycarbonyl-3-methyl-2-oxo-6-m-toluidino-3-azabenzanthrone, 2,3-dihydro-1-ethoxycarbonyl-3-methyl-2-oxo-6-o-toluidino-3-azabenzanthrone, 2,3-dihydro-3-methyl-2-oxo-6-p-toluidino-3-azabenzanthrone, 2,3-dihydro-6-(4't-amylanilino)-1-ethoxycarbonyl-3-methyl-2-oxo-3-azabenzanthrone, or 2,3-dihydro-3-methyl-6-(2,4-dimethylanilino)-1-phenyl-3-azabenzanthrone.

9. An article as in claim 4, wherein said green dye is 1,4-di-butyl anilino-5,8-dihydroxy anthraquinone and said diazabenzanthrone dye is

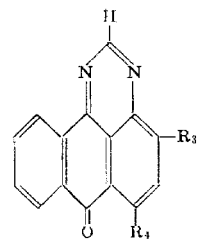

wherein $R_3$ and $R_4$ are selected from the group consisting of -H, -OH, -$NH_2$, p-$NO_2$

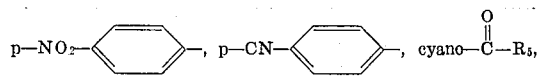

N-3(dimethylamino)-propylamino, N-(2,4-dichlorobenzoyl) amino, 4'-t-amylanilino, p-chloroanilino, 2,4-dimethylanilino, p-(1-methylbutyl)anilino, o-, m-, and p-toluidino, amido, sulfonamido, alkyl, aryl, and alkaryl; at least one of $R_3$, and $R_4$ being other than H, and at most two of $R_1$, $R_2$, $R_3$ and $R_4$ having radical weights above about 70; and $R_5$ is the same as $R_3$ or $R_4$.

10. An article as in claim 9 wherein said diazabenzanthrone dye is 6-amino-4-p-toluidino-1,3-diazabenzanthrone, 4-p-chloroanilino-1,3-diazabenzanthrone or 4-anilino-6-[N-(2,4-dichlorobenzoyl) amino]-1,3-diazabenzanthrone.

11. An article as in claim 4, wherein said polyester is a linear polyester of repeating polymethylene glycol and diacyl radicals, the number of carbon atoms in the polymethylene groups being from 2 to 8.

12. An article as in claim 4, wherein said polyester is poly(ethylene terephthalate).

13. An article as in claim 4, wherein said polyester is poly(1,4-dimethylenecyclohexylene terephthalate).

14. A fiber article according to claim 4.

15. A molded article according to claim 4.

16. A colored polyester article having an approximately neutral color; said article comprising the red dye 2,3-dihydro-3-methyl-2-oxo-6-p-toluidino-3-azabenzanthrone and the green dye 1,4-dihydroxy-5,8-di-p-toluidino anthraquinone.

17. An article according to claim 16 containing from about 40 to about 600 parts of said red dye and from about 60 to about 1,000 parts of said green dye per million parts of said colored polyester.

18. A film article comprising a colored polyester film substrate; said substrate comprising at least two different types of dyes selected from (a) the following group A azabenzanthrone dyes or group B diazabenzanthrone dyes:

A. 2,3-dihydro-1-ethoxycarbonyl-3-methyl-2-oxo-6-toluenesulfonamido-3-azabenzanthrone, 2,3-dihydro-3-methyl-2-oxo-1-p-toluidino-3-azabenzanthrone, 2,3-dihydro-6-[N-3-(dimethylamino)-propylamino]-3-methyl-2-oxo-1-phenyl-3-azabenzanthrone, 2,3-dihydro-3-methyl-6-[p-(1-methylbutyl)anilino]-2-oxo-1-phenyl-3-azabenzanthrone, 2,3-dihydro-6-(2,4-dimethylanilino)-1-ethoxycarbonyl-3-methyl-2-oxo-3-azabenzanthrone, 2,3-dihydro-6-p-chloroanilino-1-cyano-3-methyl-2-oxo-3-azabenzanthrone, 2,3-dihydro-1-ethoxycarbonyl-3-methyl-2-oxo-6-p-toluidino-3-azabenzanthrone, 2,3-dihydro-1-ethoxycarbonyl-3-methyl-2-oxo-6-m-toluidino-3-azabenzanthrone, 2,3-dihydro-1-ethoxycarbonyl-3-methyl-2-oxo-6-o-toluidino-3-azabenzanthrone, 2,3-dihydro-3-methyl-2-oxo-6-p-toluidino-3-azabesnzanthrone, 2,3-dihydro-6-(4'-t-amylanilino)-1-ethoxycarbonyl-3-methyl-2-oxo-3-azabenzanthrone or 2,3-dihydro-3-methyl-6-(2,4-dimethylanilino)-1-phenyl-3-azabenzanthrone, or B 6-amino-4-p-toluidino-1,3-diazabenzanthrone, 4-p-chloroanilino-1,3-diazabenzanthrone, or 4-anilino-6-[N-(2,4-dichlorobenzoyl)amino]-1,3-diazabenzanthrone, and at least one green dye selected from the group consisting of 1,4-dihydroxy-5,8-di-p-toluidino anthraquinone and 1,4-di-p-butyl anilino-5,8-dihydroxy anthraquinone, said green dye being 1,4-dihydroxy-5,8-di-p-toluidino anthraquinone when said azabenzanthrone or diazabenzanthrone dye is selected from group (A) or (B), when said green dye is 1,4-di-p-butyl anilino-5,8-dihydroxy anthraquinone, said azabenzanthrone or diazabenzanthrone dye is selected from group (B).

* * * * *

PO-1050
(5/69)

UNITED STATES PATENT OFFICE
CERTIFICATE OF CORRECTION

Patent No. 3,853,807     Dated December 10, 1974

Inventor(s) C. Shleburn Hunter

It is certified that error appears in the above-identified patent and that said Letters Patent are hereby corrected as shown below:

Amend the title to read -- Heat Resistant Dyes for Polyester Products --.

Amend heading to include the assignee, Eastman Kodak Company, Rochester, N. Y.

Column 2, line 54, " -NHhd2" should be -- $-NH_2$ --.

Column 10, lines 9 and 10, delete -- manufactured by any of a number of methods which will be --.

Column 10, line 15, change "or" to -- of --.

Column 12, line 37, change "azabencanthrone" to -- azabenzanthrone --.

Signed and Sealed this twenty-sixth Day of August 1975

[SEAL]

Attest:

RUTH C. MASON
Attesting Officer

C. MARSHALL DANN
Commissioner of Patents and Trademarks